US007920929B2

(12) United States Patent
Gaikwad et al.

(10) Patent No.: US 7,920,929 B2
(45) Date of Patent: Apr. 5, 2011

(54) ON-DEMAND AUTO-TUNER FOR A PLANT CONTROL SYSTEM

(75) Inventors: Sujit V. Gaikwad, Glendale, AZ (US); Sachi K. Dash, Scottsdale, AZ (US); Konstantinos S. Tsakalis, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/238,304

(22) Filed: Sep. 29, 2005

(65) Prior Publication Data

US 2007/0073422 A1    Mar. 29, 2007

(51) Int. Cl.
 G05B 13/02    (2006.01)
(52) U.S. Cl. ............... 700/37; 700/78; 700/40; 700/18; 702/140
(58) Field of Classification Search .................. 700/78, 700/40, 37, 18; 702/140
See application file for complete search history.

(56) References Cited

U.S. PATENT DOCUMENTS

| | | | | |
|---|---|---|---|---|
| 4,839,573 | A * | 6/1989 | Wise | 318/615 |
| 4,855,674 | A * | 8/1989 | Murate et al. | 700/37 |
| 5,155,422 | A * | 10/1992 | Sidman et al. | 318/560 |
| 5,394,322 | A | 2/1995 | Hansen | |
| 5,406,496 | A * | 4/1995 | Quinn | 702/106 |
| 5,485,367 | A | 1/1996 | Hiroi | |
| 2002/0111758 | A1* | 8/2002 | Wang et al. | 702/79 |
| 2003/0199997 | A1* | 10/2003 | Gao | 700/18 |
| 2007/0168085 | A1* | 7/2007 | Guilford | 700/280 |

FOREIGN PATENT DOCUMENTS

| | | |
|---|---|---|
| EP | 0453259 A1 | 4/1991 |
| EP | 0453259 A1 | 10/1991 |
| WO | WO 2004/069490 A1 | 8/2004 |
| WO | WO-2004069490 A1 | 8/2004 |

OTHER PUBLICATIONS

Auto-tuning PID using loop-shaping ideas. Gaikwad, S.; Dash, S.; Stein, G.; Proceedings of the 1999 IEEE International Conference on Control Applications, 1999. vol. 1, Aug. 22-27, 1999 pp. 589-593 vol. 1.*
"A comparison of identification-based performance bounds for robustprocess control" Adusumilli, S. Dash, S. Rivera, D.E. Tsakalis, K. Dept. of Chem., Bio & Mater. Eng., Arizona State Univ., Tempe, AZ; Control Applications, 1999. Proceedings of the 1999 IEEE International Conference. pp. 594-599 vol. 1.*
Ben Moore, "In-Cycle Control of the Thermoforming Reheat Process" Department of Electrical and Computer Engineering, McGill University, May 2002, pp. 1-142.*
Gaikwad, S. , et al., "Auto-tuning PID using loop-shaping ideas", *Proceedings of the 1999 IEEE International Conference on Control Applications*, vol. 1, (1999),589-593.
Grassi, E. , et al., "Adaptive/Self-Tuning PID Control by Frequency Loop-Shaping", *Proceedings of the 39th IEEE Conference on Decision and Control*, Sydney, Australia,(2000),pp. 1099-1101.

* cited by examiner

*Primary Examiner* — Albert Decady
*Assistant Examiner* — Tejal J Gami
(74) *Attorney, Agent, or Firm* — Schwegman, Lundberg & Woessner P.A.

(57) ABSTRACT

A method to automatically tune control systems, the method comprising selecting a target loop transfer function for at least one plant subsystem in response to an input excitation, selecting at least one fit-error criterion for a plant subsystem transfer function, and automatically inputting the input excitation and tuning the plant subsystem transfer function to the target loop transfer function. The tuning includes automatically selecting a bandwidth of the plant subsystem transfer function from a plurality of bandwidths determined in accordance with limits of the plant subsystem, inputting the input excitation to the plant subsystem, determining the fit-error of the plant subsystem transfer function to the target loop transfer function in response to the input excitation, and continuing the selecting of a bandwidth in accordance with the fit-error criterion.

21 Claims, 4 Drawing Sheets

ON-DEMAND AUTO-TUNER FOR A PLANT CONTROL SYSTEM

TECHNICAL FIELD

The field generally relates to process automation technology and in particular to control systems that automatically tune system parameters to achieve a desired process output.

BACKGROUND

Industrial plant processes contain embedded systems to achieve process automation. As processes become complex, control is distributed throughout the system. Distributed control refers to embedded processors distributed throughout a plant system to control sub-processes. The embedded processors run programs to monitor an output of a plant sub-process, or subsystem. The output can be a position, a temperature, a pressure, a voltage, or any other parameter appropriate for the sub-process. Sensors convert the parameters to electrical signals and the electrical signals are quantified for the embedded processors using analog to digital (A/D) converters. Based on the given value of a parameter, an embedded processor changes the sub-process inputs until the sub-process output meets the target value for the parameter.

Proportional integral derivative (PID) controllers are often used to control the individual sub-processes. For a proportional controller, the controller output is proportional to the error in a measurement of the parameter of interest, where error is defined as the difference between the target value of the parameter and the measured value of the parameter. A proportional integral (PI) controller is designed to eliminate an offset associated with a proportional controller by making the controller output proportional to the amount of time the error is present. In a proportional integral derivative (PID) controller, derivative action is added to increase the speed of response and to anticipate changes. The derivative term acts on the rate of change of the error.

Tuning PID control loops can be a time consuming task for process engineers. If a plant system contains dozens of PID controllers to control dozens of subsystems, tuning the overall system can require a large amount of engineering effort. The endeavor becomes truly formidable when a plant system with thousands of PID loops is considered. The present inventors have recognized a need for improved methods of tuning a distributed control plant system.

SUMMARY

Embodiments of systems and methods for auto-tuning distributed control plant systems are described herein. A system embodiment includes a plant system having at least one plant subsystem. The system also includes a controller coupled to the plant subsystem such that a feedback connection from an output of the plant subsystem is coupled to a controller input. The controller includes a tuner module. The controller has a transfer function and the feedback connection provides a combined transfer function for the subsystem. The tuner module automatically sets a bandwidth of the controller transfer function selected from a plurality of bandwidths that are predetermined in accordance with limits of the plant subsystem. The tuner module iteratively adjusts coefficients of the controller transfer function to tune the combined subsystem transfer function to a target transfer function in accordance with at least one fit-error criterion and to select a new bandwidth and readjust the controller if necessary based on the result of the tuning.

A method embodiment includes selecting a target loop transfer function for at least one plant subsystem in response to an input excitation, selecting at least one fit-error criterion for a plant subsystem transfer function, and automatically inputting the input excitation and tuning the plant subsystem transfer function to the target loop transfer function. The tuning includes automatically selecting a bandwidth of the plant subsystem transfer function from a plurality of bandwidths determined in accordance with limits of the plant subsystem, inputting the input excitation to the plant subsystem, determining the fit-error of the plant subsystem transfer function to the target loop transfer function in response to the input excitation, and continuing the selecting of a bandwidth in accordance with the fit-error criterion.

This summary is intended to provide an overview of the subject matter of the present patent application. It is not intended to provide an exclusive or exhaustive explanation of the invention. The detailed description is included to provide further information about the subject matter of the present patent application.

DETAILED DESCRIPTION

In the following detailed description, reference is made to the accompanying drawings which form a part hereof, and specific embodiments in which the invention may be practiced are shown by way of illustration. It is to be understood that other embodiments may be used and structural or logical changes may be made without departing from the scope of the present invention.

The functions or algorithms described herein are implemented in software or a combination of software and human implemented procedures in one embodiment. The software comprises computer executable instructions stored on computer readable media such as memory or other type of storage devices. The software comprises instructions stored on a physical medium that can be interpreted and executed by a machine (e.g., computer). Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

This document discusses systems and methods for auto-tuning distributed control plant systems. Proportional integral (PI) or proportional integral derivative (PID) controllers are algorithms typically used to control processes. Tuning a system that includes hundreds or even thousands of embedded processes can be a time consuming and formidable task. Auto-tuning of the system control loops helps to alleviate this problem. If the tuning is automated, an instrument technician can tune the system loops with very little or no training in control theory. The auto-tuning approach is based on loop-shaping principles. In some embodiments, auto-tuning is accomplished under closed-loop system excitation. In some embodiments, auto-tuning is accomplished under open-loop system excitation. The tuning procedure recursively adapts PI/PID parameters to achieve a target loop-shape without providing a model transfer function of the system.

Figure 1A:
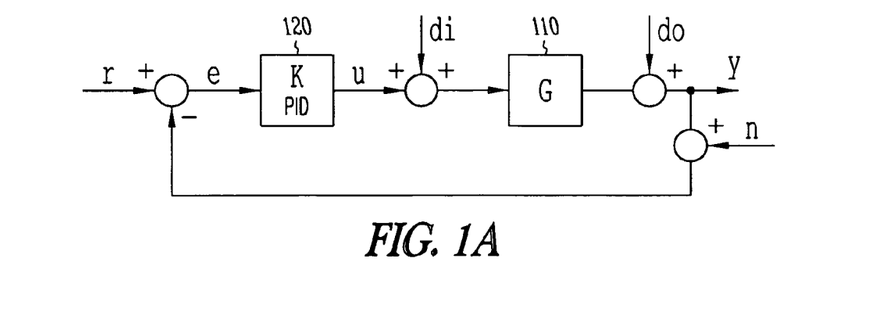
FIG. 1A shows a block diagram of a feedback control structure of a closed loop system.

FIG. 1A shows a block diagram of a classical feedback control structure 100 of a closed loop system. The error e in the system is the difference between the desired set point r and the output y. G is the transfer function of the plant system 110 or subsystem to be controlled, K is the transfer function of the controller 120 inserted into the feedback loop, n is the measurement noise, u is the controller output, di is the input disturbance to the plant, and do is the output disturbance. The transfer function of the controller 120 is a PID algorithm transfer function. In an example, the transfer function K has the form $$K = Kp + \frac{Ki}{s} + Kd\left(\frac{s}{as+1}\right), \quad (1)$$

where Kp is the proportional gain, Ki is the integral gain, and Kd is the derivative term. Equation 1 can also be expressed in the standard or ideal form:

$$K = Kc\left(1 + \frac{1}{tI*s} + (tD)\left(\frac{s}{as+1}\right)\right), \quad (2)$$

where tI is the integral time and tD is the derivative time. Other transfer functions include:

$$K = Kc\left(1 + \frac{1}{tI*s}\right)\left(\frac{1+tD*s}{1+a*tD*s}\right), \quad (3)$$

$$K = \frac{100}{P}\left(1 + \frac{1}{tI*s} + tD\left(\frac{s}{as+1}\right)\right), \quad (4)$$

where P is the controller gain, and $$K = \frac{100}{P}\left(1 + \frac{1}{tI*s}\right)\left(\frac{1+tD*s}{1+a*tD*s}\right). \quad (5)$$

Figure 1B:
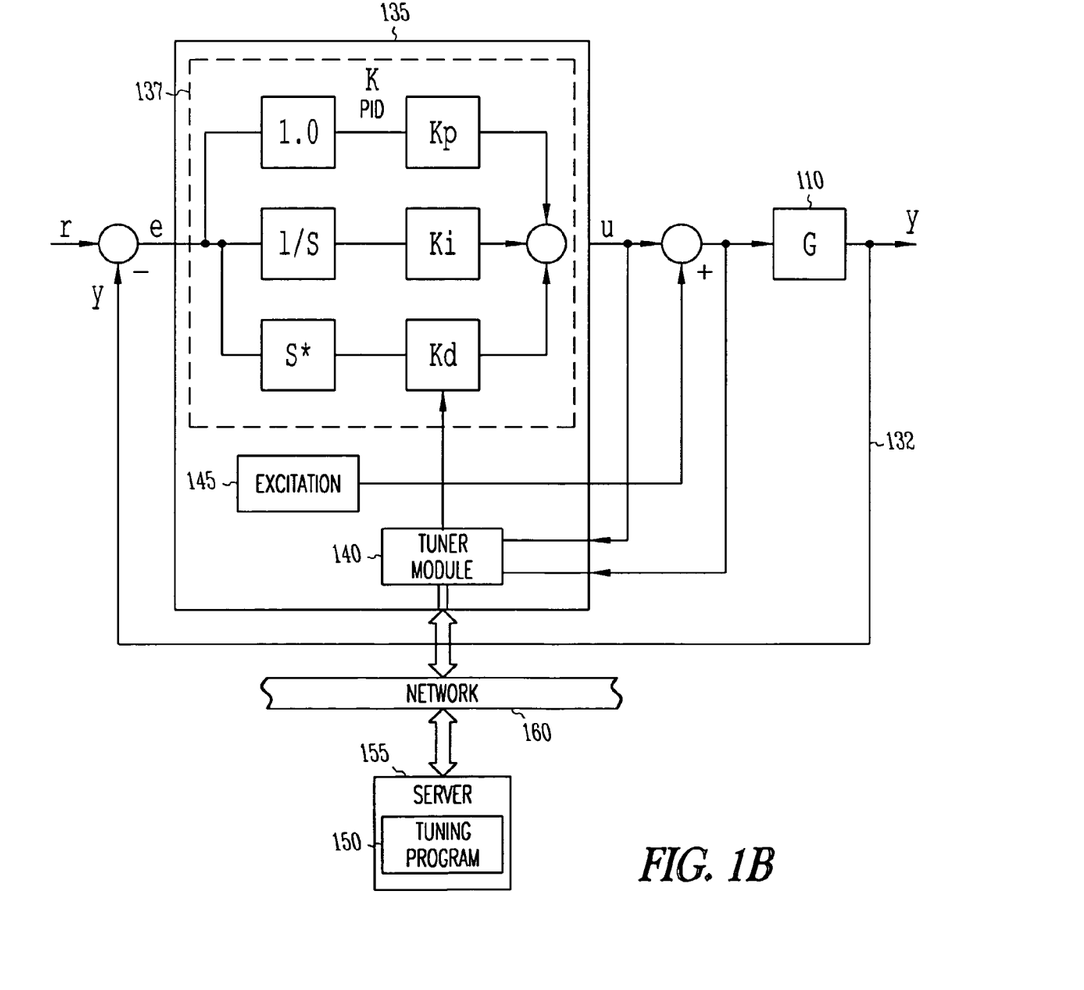
FIG. 1B shows a block diagram of an embodiment of a closed-loop system with auto-tuning added.

FIG. 1B is a block diagram of an embodiment of a closed-loop system 130 with auto-tuning added. The system 130 includes a feedback connection 132 to the input. A controller 135 of the system 130 includes a PID controller 137 and a tuner module 140. The embodiment of the controller shown uses the transfer function form of Equation 1. Other transfer function forms can also be used, such as the forms of Equations 2-5. In some embodiments, the controller is a processor, and the module includes a software application. In some embodiments, the module is implemented in a combination of hardware and software.

Although in the embodiment shown the controller 135 is a PID controller (the "s*" block 137 is the approximate derivative function $$s^* = \frac{s}{as+1}), \quad (6)$$

the transfer function K of the controller 135 is chosen so that the loop transfer function GK has the desired target-loop shape. The target-loop shape is determined by the desired closed-loop bandwidth of the system 130 and the nature of the plant system 110. For example, the target loop shape may be a first order loop of the form $$L = \frac{\omega c}{s}, \quad (7)$$

where ωc is the crossover frequency. A first order loop is useful for stable plant systems where the target output value is a stable value, such as a fill level of a tank. In another example, the plant system 110 may be an integrating plant and the target loop shape is a second order loop of the form $$L = \frac{\omega c\left(s + \frac{\omega c}{x}\right)}{s^2}. \quad (8)$$

Here, x is a parameter that governs the low frequency slope or overshoot in response to a step set-point change. In some embodiments, selecting a target-loop transfer function includes selecting the target function such that the loop shape has a high gain at low frequencies and a small gain at high frequencies above a crossover frequency (ωc).

The controller 135 includes an excitation circuit 145 to provide an excitation signal that is added to the output u of the controller 135. In some embodiments the excitation circuit is a hardware circuit. In some embodiments, the excitation circuit includes a processor running software or firmware. In some embodiments, the excitation circuit includes a combination of hardware and software or firmware. The excitation signal is selected to have power in the region of frequencies around the desired bandwidth. The excitation signal may be a series of steps, a pseudo random binary sequence, or bandpass filtered and amplitude clipped white noise. The controller 135 automatically inputs the excitation signal during the tuning procedure. The tuner module 140 determines the coefficients (or gains) Kp, Ki, and Kd for the PID transfer function by recursively minimizing a weighted fit of the error between the control-loop shape L and a target-loop shape. In some embodiments, a recursive least-squares algorithm with non-negativity constraints is used to fit the PID parameters. The auto-tuning structure is applicable to other PID controller transfer functions as well as PI controller transfer functions.

The tuning program 150 is implemented in a server 155 attached to a network 160. The block diagram of the system 130 shown includes only one closed-loop structure. However, the tuning program 150 is able to tune multiple structures connected to the network 160 simultaneously. In an embodiment, a user runs the program 150 by inputting an identifier for the loop structure, the type of target loop (e.g. stable, integrator, etc.), a step magnitude for the excitation input signal, and the desired closed loop settling time for each loop structure to be tuned. The tuning program then automatically steps the magnitude of the excitation signal to the plant systems 110 using a signal power in the frequency range based on the desired settling time. The tuning program 150 recursively computes the coefficients of the controller transfer function K as it steps the plants.

It should be noted that the tuning program 150 does not require a user to input a desired bandwidth. For plant systems 110 that have an amount of uncertainty between their theoretical transfer function G and their actual transfer function, it may not be possible to attain the desired bandwidth objective. For example, physical limits of a plant system may not be able to respond within the desired bandwidth. If the bandwidth input to the program is not possible, the tuning procedure would be unsuccessful and a tuning program would have to be run again with a different desirable bandwidth. To resolve this problem, the tuning program 150 uses multiple bandwidths based on the desired settling time to find multiple solutions for the transfer function coefficients. The bandwidths (BW) to be used are derived from the settling time constant (τ) input by the user according to $$BW = \frac{1}{N * \tau}. \quad (9)$$

The tuning program then determines a range of bandwidths to be used in the attempted solutions. In an illustrative example, the tuning program 150 attempts solutions with the bandwidth in the range of three to five time constants.

In some embodiments, the tuning program 150 chooses the final bandwidth solution based on the fit error between the loop transfer function of the tuned plant system 130 and the target loop and based on convergence criteria for the parameters. As an illustrative example using a controller 135 having a transfer function of the form of Equation 2, the tuner program 150 chooses solution criteria that includes fit error less than 0.3, and convergence of Kc, tI, and tD within less than 5% of the desired solution. Kc is the proportional gain, tI is the integral time or reset time, and tD is the derivative time as measured from the system response to the input excitation as a function of time. In some embodiments, the tuning program 150 presents multiple solutions to the user. The solutions can be presented in a ranked order, such as in a table, according to their fit error and parameter convergence.

Table 1 shows an example of coefficient results obtained from a tuning operation. The system being tuned is a flow loop using a PID controller. A different set of coefficients is obtained based on desired settling time or bandwidth. The results are listed beginning with the most aggressive settling time of 1.5 minutes to the longest settling time of thirty minutes. Users can choose a particular set of parameters depending on the desired settling time. Any one of the cases meets the fit error criterion of 0.3. The goal is to find a set of PID parameters to meet a desired flow rate.

TABLE 1

Table 1: PID tuning results using the closed-loop method.

| Des.Setl.Time | Kc | tI | tD | fit_err | Status |
|---|---|---|---|---|---|
| 1.5 | 1.6132 | 0.92371 | 0.047137 | 0.19664 | 1 |
| 3 | 0.86331 | 0.71521 | 0.068605 | 0.13072 | 1 |
| 3.75 | 0.70091 | 0.73255 | 0.071627 | 0.11151 | 1 |
| 4.5 | 0.59331 | 0.74763 | 0.073757 | 0.0991 | 1 |
| 6 | 0.46312 | 0.77298 | 0.075255 | 0.087611 | 1 |
| 7.5 | 0.39329 | 0.81682 | 0.073797 | 0.086902 | 1 |
| 9 | 0.35098 | 0.88767 | 0.068897 | 0.091745 | 1 |

TABLE 1-continued

Table 1: PID tuning results using the closed-loop method.

| Des.Setl.Time | Kc | tI | tD | fit_err | Status |
|---|---|---|---|---|---|
| 15 | 0.26104 | 1.2548 | 0.048643 | 0.10713 | 1 |
| 22.5 | 0.18633 | 2.144 | 0.024331 | 0.10378 | 1 |
| 30 | 0.14643 | 4.0712 | 0.0090353 | 0.099743 | 1 |

Figure 2:
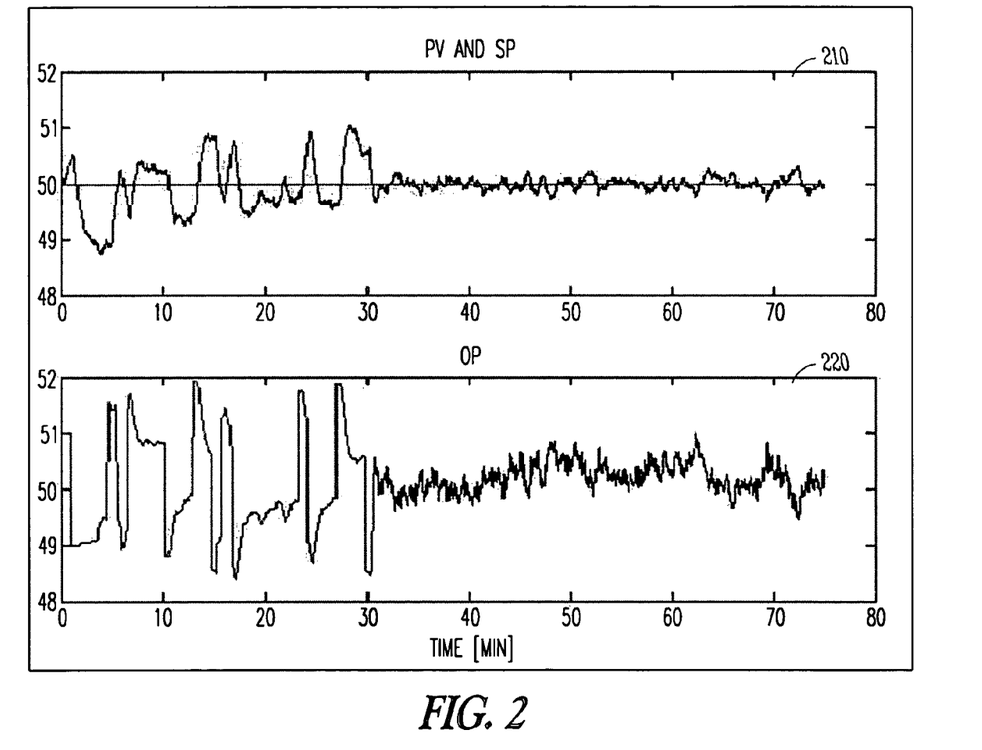
FIG. 2 shows graphs of an example of a tuning operation using a closed-loop system.

FIG. 2 shows graphs 200 of an example of the variation of system parameters during the tuning operation. The flow for the system is the Process Variable (PV). The target for the system flow rate is fifty gallons per minute (50 GPM). Flow is controlled by a valve output (OP) to maintain the PV at a set point (SP). Graph 210 shows the SP of 50 GPM and graph 220 shows the valve output OP. The excitation signal used in the example is a pseudo-random binary sequence. Graph 220 shows the OP has a contribution from the pseudo-random binary sequence and the active PID control with a feedback connection. The PID controller used is updated recursively and is changed at every time step. Graph 210 shows the resulting PV. It can be seen that tuning is completed at the end of thirty minutes.

According to some embodiments, the tuning program 150 loads tuning data from information storage. The tuning data is sometimes referred to as batch data and is data that previously obtained and stored from previously run tuning experiments on the plant system 110. For example, the batch data could be data sampled from the output of a sensor, such as a temperature sensor or a flow sensor, and stored. In some embodiments, the batch data is data obtained for a sub-process for a given excitation signal. This allows the data to be brought in to a current tuning experiment without having to re-input the excitation signals and re-run the experiment. Using batch data in a tuning experiment saves the cost of the additional testing time.

Figure 3A:
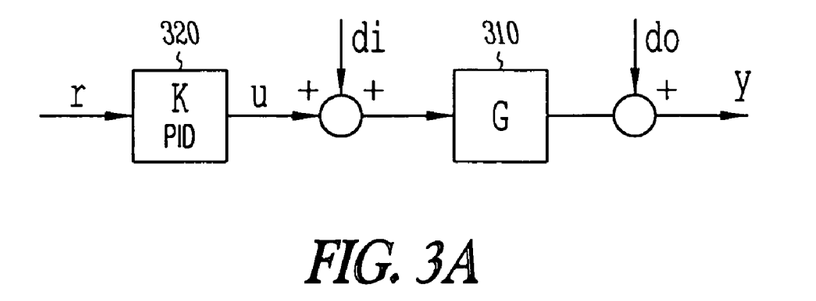
FIG. 3A shows a block diagram of a control structure of an open-loop system.
Figure 3B:
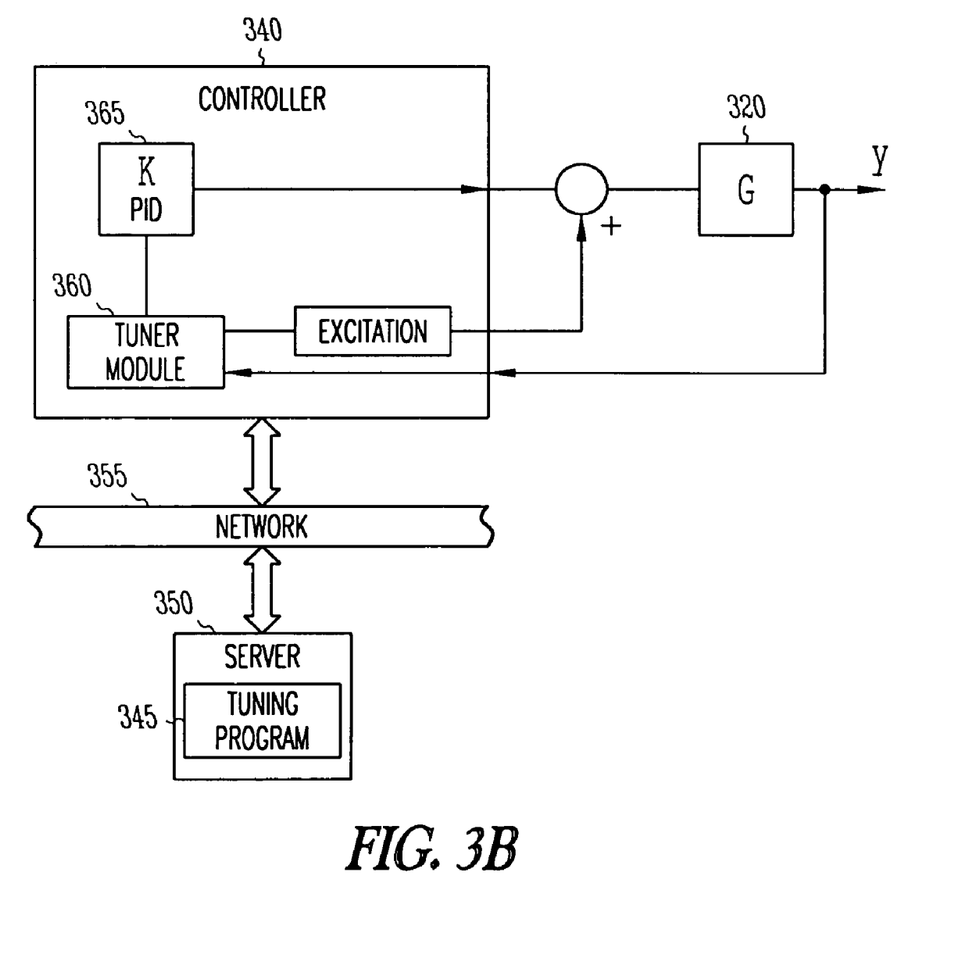
FIG. 3B shows a block diagram of an embodiment of an open-loop system with auto-tuning added.

According to some embodiments, auto-tuning is accomplished under open-loop excitation. FIG. 3A shows a block diagram of a control structure of an open-loop system 300. The system 300 includes a plant system 310 and controller 320. G is the transfer function of the plant system 310 to be controlled. Note that there is no feedback connection from the output to the input. Because the system 300 is open-loop, error between the output and the set point is not monitored. FIG. 3B is a block diagram of an embodiment of an open-loop system 330 with auto-tuning added. The system includes a controller 340 with auto-tuning. The controller 340 includes a PID controller 365 and a tuner module 360 that adjusts the controller transfer function so that the open loop transfer function of the system 330 (the combination of the PID controller transfer function K and the plant system 310 transfer function G) has the desired target shape. The PID controller 365 may use any of the transfer function forms of Equations 1-5 discussed above. The target-loop shape is determined by the desired bandwidth of the system 330 and the nature of the plant system 310. As illustrative examples, the plant system 310 may be a stable plant with a first order target loop or an integrating plant system with a second order target loop shape. Other plant systems and target loops of other orders can be tuned automatically. An excitation circuit 365 adds an excitation signal to the plant system 320. The tuner module 340 determines the parameters for the open-loop transfer function by recursively minimizing a weighted fit of the error between the control-loop shape L and a target-loop shape. In some embodiments, a recursive least-squares algorithm with non-negativity constraints is used to fit the plant system parameters.

The tuning program 345 is implemented in a server 350 attached to a network 355. The tuning program 345 is able to tune multiple structures connected to the network 355 simultaneously. In some embodiments, the structures are open-loop control structures, in some embodiments, the structures are a combination of open-loop and closed-loop structures. In an embodiment, a user runs the program 345 by inputting an identifier for the loop structure, the type of target loop (e.g. stable, integrator, etc.), a step magnitude for the excitation input, and the desired settling time for each loop structure to be tuned. The tuning program then steps the magnitude of the excitation signal to the plant systems 310 using a signal power in the frequency range based on the desired settling time. The tuning program 345 recursively calculates parameters of the plant system transfer function G as it steps the plants.

The tuning program 345 uses multiple bandwidths based on the desired settling time to find multiple solutions for the transfer function parameters. In some embodiments, the tuning program 345 presents multiple solutions to the user. In some embodiments, the tuning program 345 chooses the final bandwidth solution based on the fit error of the transfer function of the tuned system 330 to the target loop function and based on convergence criteria for the parameters.

Table 2 shows an example of coefficient results obtained from a tuning operation for an open loop system. The system being tuned is a flow loop using a PID controller. A different set of coefficients is obtained based on desired settling time or bandwidth.

TABLE 2

Table 2: PID results using the open-loop method.

| Des.Setl.Time | Kc | tI | tD | fit_err | Status |
|---|---|---|---|---|---|
| 1.5 | 1.5966 | 0.69117 | 0.043269 | 0.1893 | 1 |
| 3 | 0.88155 | 0.67576 | 0.062759 | 0.12453 | 1 |
| 3.75 | 0.71989 | 0.70362 | 0.064758 | 0.10689 | 1 |
| 4.5 | 0.614 | 0.72763 | 0.066509 | 0.094898 | 1 |
| 6 | 0.48925 | 0.79155 | 0.065541 | 0.081902 | 1 |
| 7.5 | 0.41869 | 0.86313 | 0.063144 | 0.08114 | 1 |
| 9 | 0.37515 | 0.94656 | 0.059208 | 0.086958 | 1 |
| 15 | 0.27364 | 1.4417 | 0.036123 | 0.111 | 1 |
| 22.5 | 0.20468 | 2.11 | 0.015422 | 0.12397 | 1 |
| 30 | 0.14987 | 2.8655 | 0.0066844 | 0.1389 | 1 |

Figure 4:
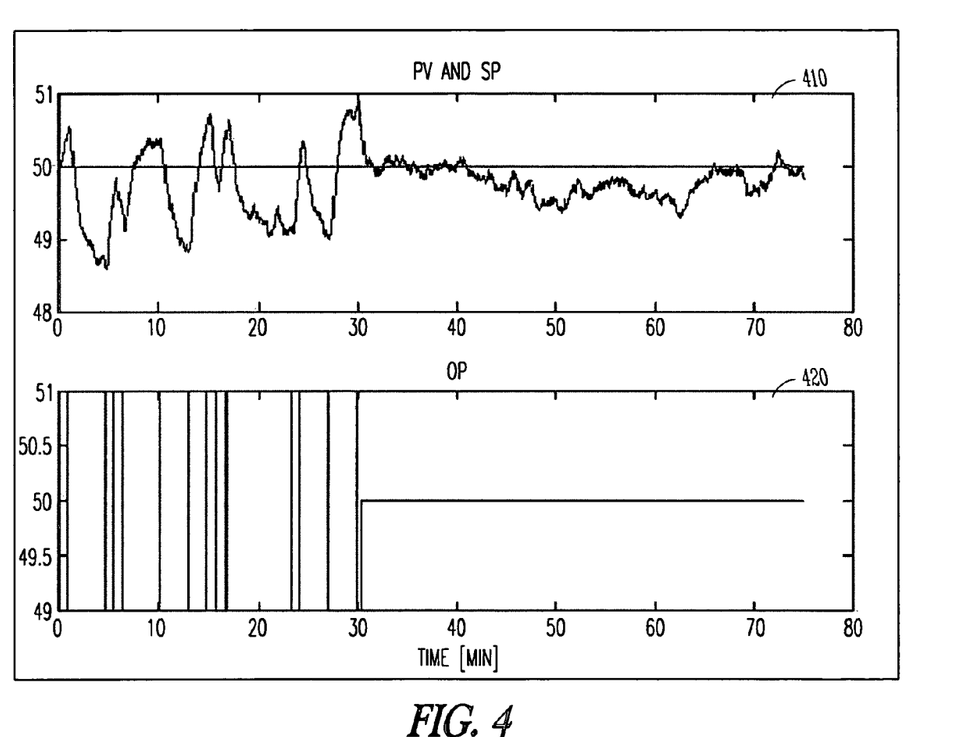
FIG. 4 shows graphs of an example of a tuning operation using an open-loop system.

FIG. 4 shows graphs 400 of an example of the variation of system parameters during the tuning operation. Graph 410 shows the SP of 50 GPM and graph 420 shows the valve output OP. The excitation signal used in the example is a pseudo-random binary sequence. Graph 420 shows the OP using only the pseudo-random binary sequence and without the active PID control of a feedback connection. The PID controller used is updated recursively and is changed at every time step. Graph 410 shows the resulting PV. Again tuning is completed at the end of thirty minutes. It can be seen from a comparison of FIGS. 2 and 4 that PV is maintained closer to the SP in the closed-loop method.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. A method comprising:
   selecting a target loop transfer function for at least one plant subsystem in response to an input excitation, wherein the plant subsystem produces an output for an automated sub-process of the plant;
   auto-tuning the plant subsystem transfer function to the target loop transfer function using a controller device, wherein the auto-tuning by the controller device includes:
      the controller device selecting and setting a bandwidth of the plant subsystem transfer function selected from a plurality of bandwidths, the plurality of bandwidths determined by the controller device in accordance with a target settling time of the plant subsystem;
      the controller device running the plant subsystem and inputting an input excitation signal to the plant subsystem;
      the controller device adjusting the plant subsystem transfer function to the target loop transfer function according to a fit error criterion to obtain a transfer function solution for the bandwidth;
      the controller device continuing the selecting and setting of the bandwidth to obtain a plurality of transfer function solutions in accordance with the fit-error criterion;
      the controller device ranking at least a portion of the resulting transfer functions for the selected bandwidths according to an associated calculated fit error; and
      the controller device controlling the plant subsystem using the adjusted transfer function.

2. The method of claim 1, wherein ranking at least a portion of the plurality of bandwidths includes further ranking the selected bandwidths according to a measure of parameter convergence calculated using a difference from the target loop transfer function.

3. The method of claim 1, wherein the target settling time is entered by a user.

4. The method of claim 1, wherein selecting a target loop transfer function further includes selecting a target loop transfer function for a plant subsystem coupled to a controller,
wherein tuning the plant subsystem transfer function further includes adjusting a controller transfer function to tune the plant subsystem transfer function to the target loop transfer function, and
wherein the tuning further includes:
calculating coefficients of the controller transfer function based at least in part on the selected bandwidth, the calculating executed iteratively; and
continuing the selecting and calculating in accordance with the fit-error.

5. The method of claim 4, wherein selecting a target loop transfer function includes selecting a target loop transfer function for a plant subsystem coupled to a controller in a closed-loop feedback manner.

6. The method of claim 4, wherein selecting a target loop transfer function includes selecting a target loop transfer function for a plant subsystem coupled to a controller in an open-loop feedback manner.

7. The method of claim 4, wherein adjusting a controller transfer function includes adjusting a control system transfer function "K" selected from the group consisting of:

$$K = Kp + \frac{Ki}{s} + Kd\left(\frac{s}{as+1}\right);$$

$$K = Kc\left(1 + \frac{1}{tI*s} + (tD)\left(\frac{s}{as+1}\right)\right);$$

$$K = Kc\left(1 + \frac{1}{tI*s}\right)\left(\frac{1+tD*s}{1+a*tD*s}\right);$$

$$K = \frac{100}{P}\left(1 + \frac{1}{tI*s} + tD\left(\frac{s}{as+1}\right)\right); \text{ and}$$

$$K = \frac{100}{P}\left(1 + \frac{1}{tI*s}\right)\left(\frac{1+tD*s}{1+a*tD*s}\right),$$

wherein Kp is the proportional gain, Ki is the integral gain, Kd is the derivative gain, Kc is the proportional gain, tI is the integral time, tD is the derivative time, and P is the controller gain.

8. The method of claim 4, wherein adjusting a controller transfer function to tune the plant subsystem transfer function includes loading tuning data from information storage, the tuning data including data obtained from tuning experiments previously run on the plant subsystem.

9. A computer readable medium containing computer executable instructions which when executed on a controller device implement a method comprising:
automatically selecting and setting a target loop transfer function for at least one plant subsystem in response to an input excitation, wherein the plant subsystem produces an output for an automated sub-process of the plant; and
auto-tuning the plant subsystem transfer function to the target loop transfer function using the controller, wherein the auto-tuning by the controller device includes:
the controller device selecting a bandwidth of the plant subsystem transfer function selected from a plurality of bandwidths, the plurality of bandwidths determined in accordance with a target settling time of the plant subsystem;
the controller device running the plant subsystem and inputting an input excitation signal to the plant subsystem;
the controller device adjusting the plant subsystem transfer function to the target loop transfer function according to a fit error criterion to obtain a transfer function solution for the bandwidth;
the controller device continuing the selecting and setting of the bandwidth to obtain a plurality of transfer function solutions in accordance with the fit-error criterion; and
the controller device ranking at least a portion of the resulting transfer functions for the selected bandwidths according to an associated calculated fit error to provide control of the plant subsystem in accordance with the target transfer function.

10. A system comprising:
a plant system having at least one plant subsystem to implement a plant sub-process, the plant subsystem having an output, an excitation input, and a transfer function that relates the input to the output;
at least one controller device having a transfer function, the controller device coupled to at least one plant subsystem providing a combined controller-subsystem transfer function, the controller device including:
a tuner module operable to:
set a bandwidth of the controller device transfer function selected from a plurality of bandwidths, the plurality of bandwidths predetermined by the tuner module in accordance with a target settling time;
iteratively adjust coefficients of the controller device transfer function in response to an excitation input to tune the combined controller-subsystem transfer function to a target transfer function in accordance with at least one fit-error criterion;
select and set a new bandwidth and readjust the controller coefficients to obtain a new controller-subsystem transfer function if necessary based on the result of the tuning; and
rank the selected bandwidths according to an associated calculated fit error of the resulting controller-subsystem transfer functions; and
wherein the controller device controls the plant subsystem using the adjusted transfer function.

11. The system of claim 10, wherein the controller is coupled to the plant subsystem in a closed-loop manner such that a feedback connection from the plant subsystem output is coupled to a controller input, the feedback connection providing the combined controller-subsystem transfer function.

12. The system of claim 10, wherein the controller is coupled to the plant subsystem in an open-loop manner.

13. The system of claim 10, wherein the tuner module is further operable to set the bandwidth of the controller transfer function to each of the plurality of the predetermined bandwidths and to further rank the predetermined bandwidths based on a parameter convergence criterion, and wherein the tuner module further includes an input to receive the target plant subsystem settling time from the user.

14. The system of claim 10, wherein the controller transfer function "K" has the form:

$$K = Kp + \frac{Ki}{s} + Kd\left(\frac{s}{as+1}\right),$$

and the tuner module adjusts the controller transfer function by recursively calculating values for Kp, Ki, and Kd, wherein Kp is the proportional gain, Ki is the integral gain, Kd is the derivative gain.

15. The system of claim 10, wherein the controller transfer function "K" has the form:

$$K = Kc\left(1 + \frac{1}{tI*s} + (tD)\left(\frac{s}{as+1}\right)\right),$$

and the tuner module adjusts the controller transfer function by recursively calculating values for Kc, tI, and tD, wherein Kc is the proportional gain, tI is the integral time, tD is the derivative time.

16. The system of claim 10, wherein the controller transfer function "K" has the form:

$$K = Kc\left(1 + \frac{1}{tI*s}\right)\left(\frac{1+tD*s}{1+a*tD*s}\right),$$

and the tuner module adjusts the controller transfer function by recursively calculating values for Kc, tI, and tD, wherein Kc is the proportional gain, tI is the integral time, tD is the derivative time.

17. The system of claim 10, wherein the controller transfer function "K" has the form:

$$K = \frac{100}{P}\left(1 + \frac{1}{tI*s} + tD\left(\frac{s}{as+1}\right)\right),$$

and the tuner module adjusts the controller transfer function by recursively calculating values for P, tI, and tD, wherein P is the controller gain, tI is the integral time, tD is the derivative time.

18. The system of claim 10, wherein the controller transfer function "K" has the form:

$$K = \frac{100}{P}\left(1 + \frac{1}{tI*s}\right)\left(\frac{1+tD*s}{1+a*tD*s}\right),$$

and the tuner module adjusts the controller transfer function by recursively calculating values for P, tI, and tD, wherein P is the controller gain, tI is the integral time, tD is the derivative time.

19. The system of claim 10, wherein the system further includes information storage coupled to the tuner module, wherein the tuning module is further operable to load tuning data for the plant system, the tuning data including data obtained from tuning experiments previously run on the plant system.

20. The system of claim 10, wherein system further includes a server in communication with the tuner module via a computer network, and wherein a tuning program implemented on the server is operable to simultaneously tune a plurality of subsystems of the plant system and to predetermine a plurality of bandwidths for each subsystem.

21. The system of claim 20, wherein the server further includes an input to receive a desired target loop transfer function type from a user.

* * * * *